United States Patent [19]

Noguchi

[11] Patent Number: 4,768,348
[45] Date of Patent: Sep. 6, 1988

[54] APPARATUS FOR CONTROLLING A REFRIGERANT EXPANSION VALVE IN A REFRIGERATION SYSTEM

[75] Inventor: Ichiro Noguchi, Saitama, Japan

[73] Assignee: Diesel Kiki Kabushiki Kaisha, Tokyo, Japan

[21] Appl. No.: 73,298

[22] Filed: Jul. 13, 1987

Related U.S. Application Data

[63] Continuation of Ser. No. 833,636, Feb. 25, 1986, abandoned.

[30] Foreign Application Priority Data

Feb. 26, 1985 [JP] Japan ................................ 60-039012

[51] Int. Cl.⁴ ............................................ F25B 41/04
[52] U.S. Cl. ........................................ 62/225; 62/211; 62/212; 62/223
[58] Field of Search ................. 62/225, 224, 223, 222, 62/210, 211, 212, 204, 205

[56] References Cited

U.S. PATENT DOCUMENTS

| | | | |
|---|---|---|---|
| 2,856,759 | 10/1958 | Barbulesco | 62/225 X |
| 4,112,703 | 9/1978 | Kountz | 62/211 |
| 4,475,686 | 10/1984 | Huelle et al. | 62/225 X |
| 4,499,739 | 2/1985 | Matsuoka et al. | 62/225 X |
| 4,523,435 | 6/1985 | Lord | 62/225 X |
| 4,571,951 | 2/1986 | Szymaszek | 62/225 X |

*Primary Examiner*—Harry B. Tanner
*Attorney, Agent, or Firm*—Flynn, Thiel, Boutell & Tanis

[57] ABSTRACT

A cooling unit for an automotive air-conditioning system, comprising an evaporator, a compressor, an expansion valve connected to the inlet port of the evaporator, an accumulator connected to the outlet port of the evaporator, a temperature sensor for detecting the temperature of the refrigerant at the outlet port or within the evaporator, and temperature control means which controls the degree of opening of the expansion valve so that the temperature of the refrigerant at the outlet port or within the evaporator is maintained above a predetermined temperature which is slightly higher than a temperature at which the evaporator becomes frosted. The degree of opening of the expansion valve is increased to raise the vapor pressure of the refrigerant in the evaporator, instead of stopping the compressor, when the temperature of the refrigerant at the outlet port or within the evaporator drops to the predetermined temperature, so that the frequency of starting and stopping the compressor is reduced.

2 Claims, 2 Drawing Sheets

APPARATUS FOR CONTROLLING A REFRIGERANT EXPANSION VALVE IN A REFRIGERATION SYSTEM

This application is a continuation of U.S. Ser. No. 833,636, filed Feb. 25, 1986, abandoned.

BACKGROUND OF THE INVENTION

1. Field of the Invention

The present invention relates to a cooling unit for an automotive air-conditioning system and, more specifically, to a cooling unit which reduces the frequency of starting and stopping the compressor thereof when the temperature of the refrigerant in the evaporator is near the frosting point of the evaporator.

2. Description of the Prior Art

A conventional cooling unit for an automotive air-conditioning system is illustrated in FIG. 4. In FIG. 4, there is shown an evaporator 1, a compressor 2 connected to the outlet port of the evaporator 1 with a pipe 3, and a condenser 4 connected to the compressor 2 with a pipe 5 and to the inlet port of the evaporator 1 with a pipe 7 provided with an expansion valve 6. A temperature sensor 8 and a pressure sensor 9 are provided in the pipe 3 near the outlet port of the evaporator 1 to detect the temperature T and the pressure P of the refrigerant. A superheat control means 10 is provided to regulate the flow rate of the refrigerant by regulating the opening of the expansion valve 6 on the basis of the detection signals of the temperature sensor 8 and the pressure sensor 9. The superheat control means 10 has an arithmetic means 11 which determines the degree of superheat on the basis of the temperature T and the pressure P of the refrigerant. The superheat control means 10 regulates the opening of the expansion valve 6 according to the degree of superheat so that the cooling operation is carried out properly. In FIG. 4, indicated at 12 is an AD (analog to digital) converter.

The conventional cooling unit thus constituted, however, has the following problems. For example, when the cooling load on the cooling unit is extremely small, the operation of the compressor 2 is interrupted to prevent frosting of the evaporator 1. Such a manner of operation is designated commonly as cycling driving. Accordingly, when the cooling load increases and decreases alternately and repeatedly, the frequency of interruption of the operation of the compressor 2 at a temperature near the frosting point of the evaporator 1 increases accordingly. Consequently, the load on the comressor 2 increases and unagreeable cooling results.

An invention relating to the cooling unit is disclosed in Japanese Patent Publication No. 54-37421. However, this proposed invention is unable to solve the above-mentioned problems.

SUMMARY OF THE INVENTION

Accordingly, it is an object of the present invention to provide a cooling unit capable of reducing the frequency of starting and stopping the compressor thereof when the temperature of the refrigerant in the evaporator is near the frosting point of the evaporator so that the load on the compressor is reduced.

It is another object of the present invention to provide a cooling unit capable of reducing the frequency of starting and stopping the compressor thereof to prevent the sudden variation of the air-conditioning control operation.

It is a further object of the present invention to provide a cooling unit capable of reducing the frequency of starting and stopping the compressor thereof and capable of being constituted without requiring large modification of the conventional constitution.

The above and other objects, features and advantages of the present invention will become more apparent from the following description of the preferred embodiment thereof taken in conjunction with the accompanying drawings.

DESCRIPTION OF THE PREFERRED EMBODIMENT

Figure 1:
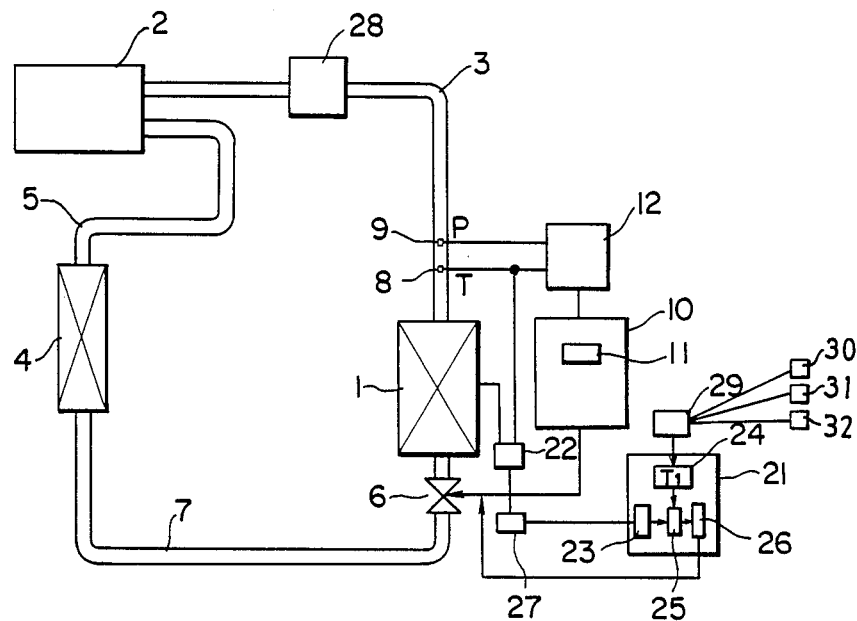
FIG. 1 is a block diagram showing the constitution of a cooling unit, in a preferred embodiment, according to the present invention.
Figure 2:
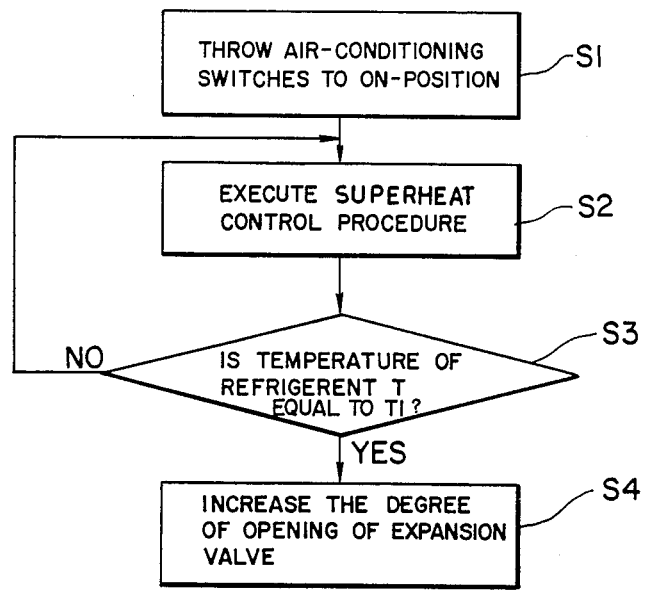
FIG. 2 is a flow chart of a control program for controlling the cooling unit of FIG. 1.
Figure 3:
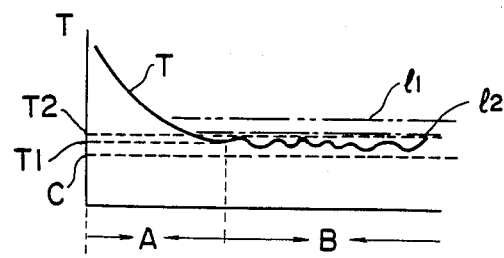
FIG. 3 is a graph for assistance in explaining the function of the cooling unit of FIG. 1.
Figure 4:
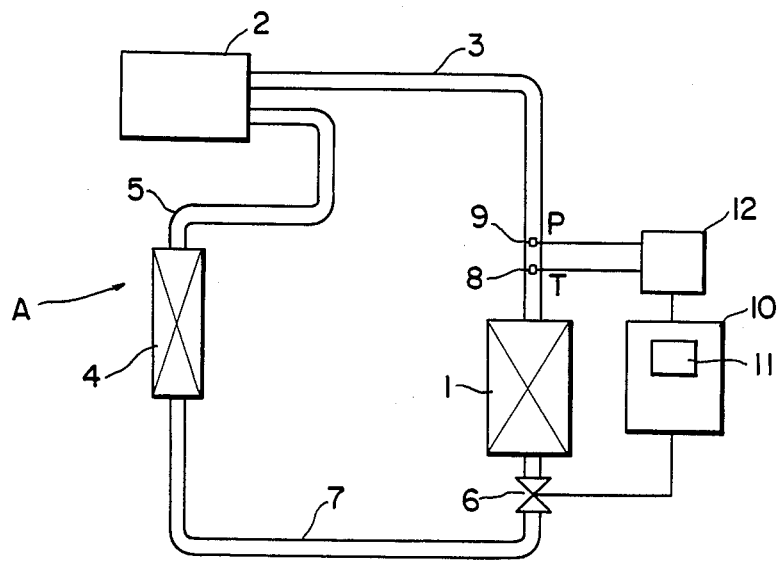
FIG. 4 is a block diagram showing the constitution of a conventional cooling unit.

In FIGS. 1 to 4, like reference characters designate like or corresponding parts and components throughout, and hence in the description of the components of a cooling unit according to the present invention, a discussion of those which are the same as those of the conventional cooling unit will be omitted for simplicity.

In FIG. 1, indicated at 21 is a temperature control means comprising: an input unit 23 which receives through a selector switch 22 a temperature signal representing a temperature detected by a temperature sensor 8 provided at the outlet of an evaporator 1 or by another temperature sensor, not shown, provided within the evaporator 1; a memory 24 storing data representing a predetermined temperature T1 corresponding to the sum of the frosting temperature C of the evaporator 1 and a fixed temperature in the range of 1 to 3 degrees; a comparator 25 which compares the detected temperature with the predetermined temperature T1 and provides a decision signal upon the coincidence of the detected temperature with the predetermined temperature T1; and a valve controller 26 which regulates the degree of opening of an expansion valve 6 upon the reception of the decision signal from the comparator 25. Indicated at 27 is an AD (analog to digital) converter and at 28 is an accumulator provided in a pipe 3 interconnecting the evaporator 1 and a compressor 2. The function of the cooling unit thus constituted according to the present invention will be described hereinafter with reference to FIG. 2.

At Step S1, an air-conditioning switch is closed to actuate the compressor 2. Then, the temperature T of the refrigerant starts dropping. During operation, a superheat control means 10 controls the degree of superheat at Step S2 on the basis of detection signals given thereto by the temperature sensor 8 and a pressure sensor 9 so that the degree of superheat is in agreement with a predetermined value (Section A in FIG. 3).

When the drop of the temperature T of the refrigerant to the predetermined temperature T1 is detected by the comparator 25 at Step S3, the valve controller 26 increases the degree of opening of the expansion valve 6 by an appropriate degree at Step S4. Then, the restricting effect of the expansion valve 6 is reduced, and thereby the pressure of the refrigerant in the evaporator is increased, and hence the temperature T of the refrigerant stops dropping. When the temperature T of the refrigerant rises thereafter to a temperature T2, the degree of opening of the expansion valve 6 is reduced to lower the temperature T of the refrigerant (Section B in FIG. 3). Thus the drop of the temperature T of the refrigerant below the predetermined temperature T1 is inhibited and the temperature T of the refrigerant is maintained in the range from T1 to T2 by regulating the degree of opening of the expansion valve 6 with the temperature control means 21.

According to the present invention, since the drop of the temperature T of the refrigerant is stopped when the temperature T of the refrigerant drops to the predetermined temperature T1 by opening the expansion valve 6, the frosting of the evaporator 1 can be prevented without stopping the compressor 2 every time the temperature T of the refrigerant drops to the predetermined temperature T1, and hence the frequency of starting and stopping the compressor 2 is reduced. The compressor 2 is not stopped unit the temperature T of the refrigerant tends to drop still further below the predetermined temperature T1 due to the reduction of the cooling load on the cooling unit after the expansion valve 6 has been opened to the maximum extent. Thus, the frosting of the evaporator 1 is prevented by maintaining the temperature T of the refrigerant somewhat above the frosting point C by regulating the degree of opening of the expansion valve 6 and also by stopping the compressor 2 when the drop of the temperature T of the refrigerant cannot be stopped by regulating the degree of opening of the expansion valve 6. In Section B, since the cooling load is small as compared with the cooling capacity of the cooling unit, some liquefied refrigerant tends to flow out the outlet of the evaporator 1. This liquefied refrigerant is accumulated in an accumulator 28 to prevent the flow of the liquefied refrigerant into the compressor 2. As indicated at 29 in FIG. 1, a level regulating means capable of changing the contents of the memory 24 of the temperature control means 21 may be provided. When such a level regulating means 29 is provided, the contents of the memory 24 can be optionally changed taking into consideration fresh air temperature from a sensor 30, room or compartment temperature from a sensor 31 and/or intensity of insolation from a sensor 32, in order to set the predetermined temperature T1 at an optional temperature as indicated by broken lines 11 and 12 in FIG. 3.

Although the invention has been described in its preferred form with a certain degree of particularity, it is to be understood that many changes and variations are possible in the invention without departing from the scope and spirit thereof.

What is claimed is:

1. A cooling unit for cooling a compartment, comprising:
   (a) an evaporator having an interior and having an inlet port and an outlet port which are each in fluid communication with the interior thereof;
   (b) an expansion valve connected to the inlet port of the evaporator;
   (c) an accumulator connected to the outlet port of the evaporator;
   (d) temperature sensor means for detecting the temperature of a refrigerant at one of the outlet port and the interior of the evaporator;
   (e) superheat sensor means for detecting a superheat value of the refrigerant;
   (f) superheat control means responsive to said superheat sensor means for controlling the degree of opening of the expansion valve as a function of the superheat value when the temperature of the refrigerant is above a predetermined temperature; and
   (g) temperature control means responsive to the temperature sensor means and operative when the temperature of the refrigerant is below the predetermined temperature for controlling the expansion valve so that the temperature of the refrigerant at the temperature sensor means is maintained within a predetermined range of temperature; and
   (h) level regulating means for regulating the predetermined range of temperature as a function of at least one of a fresh air temperature, a temperature within the compartment being cooled, and an intensity of insolation.

2. A cooling unit comprising:
   (a) an evaporator having an interior and having an inlet port and an outlet port which are each in fluid communication with the interior thereof;
   (b) an expansion valve connected to the inlet port of the evaporator;
   (c) an accumulator connected to the outlet port of the evaporator;
   (d) temperature sensor means for detecting the temperature of a refrigerant at one of the outlet port and the interior of the evaporator;
   (e) superheat sensor means for detecting a superheat value of the refrigerant;
   (f) superheat control means responsive to said superheat sensor means for controlling the degree of opening of the expansion valve as a function of the superheat value when the temperature of the refrigerant is above a predetermined temperature; and
   (g) temperature control means responsive to the temperature sensor means and operative when the temperature of the refrigerant is below the predetermined temperature for controlling the degree of opening of the expansion valve so that the temperature of the refrigerant at the temperature sensor means is maintained within a predetermined range of temperature;
   wherein the temperature control means includes memory means for storing predetermined temperature data, comparative means for comparing the predetermined temperature data from the memory means to the temperature detected by the temperature sensor means, and valve controller means responsive to the comparator means and operatively coupled to the expansion valve for regulating the degree of opening of the expansion valve.

* * * * *